United States Patent [19]
Larson

[11] Patent Number: 5,818,667
[45] Date of Patent: Oct. 6, 1998

[54] RETAINING APPARATUS FOR A DISK DRIVE ACTUATOR ASSEMBLY ELECTRICAL FLEX CIRCUIT

[75] Inventor: Nils Larson, San Jose, Calif.

[73] Assignee: Western Digital Corporation, Irving, Calif.

[21] Appl. No.: 778,190

[22] Filed: Jan. 2, 1997

Related U.S. Application Data

[63] Continuation of Ser. No. 414,796, Mar. 31, 1995, abandoned.

[51] Int. Cl.$^6$ .............................. G11B 5/54; G11B 21/08
[52] U.S. Cl. ........................................ 360/106; 360/97.01
[58] Field of Search .................................. 360/106, 105, 360/97.01, 97.02; 369/222

[56] References Cited

U.S. PATENT DOCUMENTS

| | | | |
|---|---|---|---|
| 4,933,785 | 6/1990 | Morehouse et al. | 360/78.04 |
| 5,103,359 | 4/1992 | Marazzo | 360/104 |
| 5,109,310 | 4/1992 | Ohkjita et al. | 360/106 |
| 5,130,895 | 7/1992 | Somemiya et al. | 361/398 |
| 5,185,683 | 2/1993 | Oberg et al. | 360/104 |
| 5,325,252 | 6/1994 | Yagi et al. | 360/106 |
| 5,375,021 | 12/1994 | Boeckner | 360/97.01 |
| 5,426,549 | 6/1995 | Sakai | 360/106 |

*Primary Examiner*—Stuart S. Levy
*Assistant Examiner*—William R. Korzuch
*Attorney, Agent, or Firm*—W. Chris Kim; Leo J. Young; Milad G. Shara

[57] ABSTRACT

A rotating disk memory apparatus includes an actuator assembly electrical interconnect. Flex circuit tape retainers are provided to substantially reduce and ideally eliminate torque forces on the actuator due to flex circuit bending. The retainers includes a tape guide having an inner wall to conform those portions of the flex circuit proximate both an actuator body member and a base plate connector member to predetermined configurations, such as loops providing a design specific exit angle for the flex circuit at each retainer. The looped portion of the flex circuit is held in the guide by a selectively detachable guide post device. The predetermined configuration is designed to minimize the torque on the actuator from inherent spring forces generated due to bending of the flex circuit during actuator motion relative to the rotating disk.

8 Claims, 8 Drawing Sheets

RETAINING APPARATUS FOR A DISK DRIVE ACTUATOR ASSEMBLY ELECTRICAL FLEX CIRCUIT

CROSS-REFERENCE TO RELATED APPLICATIONS

This application is a file-wrapper continuation of the parent application 08/414,796 filed on Mar. 31, 1995 and now abandoned.

BACKGROUND OF THE INVENTION

1. Field of the Invention

The present invention relates generally to rotating magnetic disk memories and, more specifically, to a disk drive actuator assembly electrical interconnect.

2. Description of the Related Art

Fundamentals of magnetic recording and disk drives can be found in *The Complete Handbook of Magnetic Recording* by Finn Jorgensen, copyright 1988 (3rd Edition), TAB BOOK Inc., incorporated herein by reference in applicable parts.

Basically, a disk drive uses at least one, movable, data transducer (also known as a recording head, head element, or simply the head) to write and read flux transition patterns—representative of digital data—in concentric circular tracks on an adjacent recording surface of a rotating disk. The heads "fly" over the recording surface in that there is no substantial contact between a head element and the disk recording surface when the disk is rotating. It is common to use an array of stacked disks, having recording areas con both surfaces, and a head for each recording surface.

A head positioner assembly is known as an actuator assembly. The magnetic heads must be positioned over the correct track before writing or reading data. This is accomplished by suspending the head elements from support arms of the actuator and moving the heads in a substantially radial stroke across the tracks. The present invention is for a rotary type actuator.

As shown in FIG. 1 (Prior Art), it is known to use a solid metallic E-block 102 for an actuator body portion 108 and head suspension support arms each having a swage hole 106 for mounting a head suspension assembly (not shown). A coil member 104 is attached thereto to form part of a voice coil motor (not shown) used to provide rotary motion about a pivot axis disposed in pivot bearing hole 110. A latch tang 105 is connected to the coil for limiting the stroke of the heads across the media surface and for providing a latching capability to a magnetic retaining device (not shown). As this construction is mostly metal, it has an inherently high moment of inertia which adversely affects actuator performance. Conventionally, aluminum is used to form the E-block 102 by stamping, extruding, or casting, and then machining the part as needed. The use of another metal, such as magnesium, having a lower density and higher modulus of elasticity to reduce the inertia factor, would be more expensive. Additionally, such metals may require corrosion protection, adding further costs. Lowering inertial factors that affect the motion of the actuator would allow for a faster seek track cycle.

Generally in the art, the read-write heads are electrically connected to either a pre-amplifier or other circuitry (usually in the nature of an integrated circuit), or to an electrical connector for connecting the actuator to a printed circuit board. Electrically connecting the actuator to the requisite circuitry creates design difficulties in that the physical connections ideally should not impede efforts to rotate the actuator.

It is known to use flexible circuits (also known as flex circuits) to connect the electrical leads from the individual head elements, the coil, and to provide an actuator body and circuitry connection to base ground. Flex circuits are fine, conductive filaments laminated between layers of polyimide tape, such as KAPTON™. Flex circuits provide reliable electrical interconnections particularly suited to moving mechanisms.

In the market-driven efforts to reduce disk drive costs, product designs have continually been refined to simplify assembly methods and combine part functionality to reduce both the number of component parts and assembly costs. Prior art has utilized threaded fasteners, formed-metal clips, adhesives, and the like, to retain and guide flex circuits onto actuator assemblies. Threaded fasteners and metal clips provide a simple method of assembly and maintenance, but are costly and add weight to the actuator. Adhesives are lower in cost, but difficult to work with during repair operations. Moreover, the use of adhesives require costly tooling and extensive process controls.

One bracket-type fastening of a flex circuit on an actuator is shown in U.S. Pat. No. 5,375,021 (Boeckner). Boeckner's express intent is to have a bracket attachable to an actuator arm that biases the actuator toward a rest position at the center of the disk. See e.g., column 3, lines 26–28. That is, Boeckner loops the flex circuit to provide a spring force to move the actuator arm toward a landing zone at the disk center when the drive is not running. However, not all drive designs are conducive to the use of such a biasing force and, in fact, such a bias adversely affects track seeking and servo track following control operations.

Thus, there is a need for a simple and inexpensive actuator electrical interconnect mechanism which compensates for undesirable torque on the actuator.

SUMMARY OF THE INVENTION

In its basic aspects, the present invention provides a rotating disk drive apparatus that includes: a base; at least one rotatable data storage disk, having at least one recording surface adapted for storage and retrieval of data thereon and a mounting aperture therethrough; a motor, mounted to the base and coupled to the disk for selectively imparting rotational motion to the disk; a head stack assembly, having a body member pivotally mounted on the base for rotating the assembly about a pivotal axis and a flex circuit. A mechanism is provided for coupling a first end of the flex circuit to the body member of said head stack assembly. A similar mechanism is provided for coupling a second end of the flex circuit to the base. Each of these couplings includes: tape guiding mechanisms for conforming a portion of the flex circuit in a predetermined path and retaining mechanisms, detachably coupled to the tape guiding mechanisms, for holding that portion of the flex circuit in that predetermined path. Spring force vectors from the flex circuit are directed substantially toward the pivotal axis throughout the rotation of the assembly about the axis.

It is noteworthy that the mechanisms for coupling the flex circuit to the body member and the base are designed to minimize or, ideally, eliminate, torque applied to thus actuator as a consequence of spring bias type forces developed in the bending of the flex circuit.

It is an advantage of the present invention that it provides a disk drive actuator assembly having an electrical interconnect that is relatively easy to manufacture.

It is another advantage of the present invention that it provides a disk drive actuator head stack assembly that has a lower cost of manufacture.

It is yet another advantage of the present invention that it provides improved reliability in a disk drive.

It is another advantage of the present invention that it provides improved servo performance in a disk drive.

It is a further advantage of the present invention that it is adaptable to a variety of disk drive actuator designs.

It is still another advantage of the present invention that its can be integrated into a multifunctional part, resulting in fewer piece parts, speeding the manufacturing process, and providing better control of critical feature location and orientation.

Other objects, features and advantages of the present invention will become apparent upon consideration of the following detailed description and the accompanying drawings, in which like reference designations represent like feature, throughout the FIGURES.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable.

Figure 2:
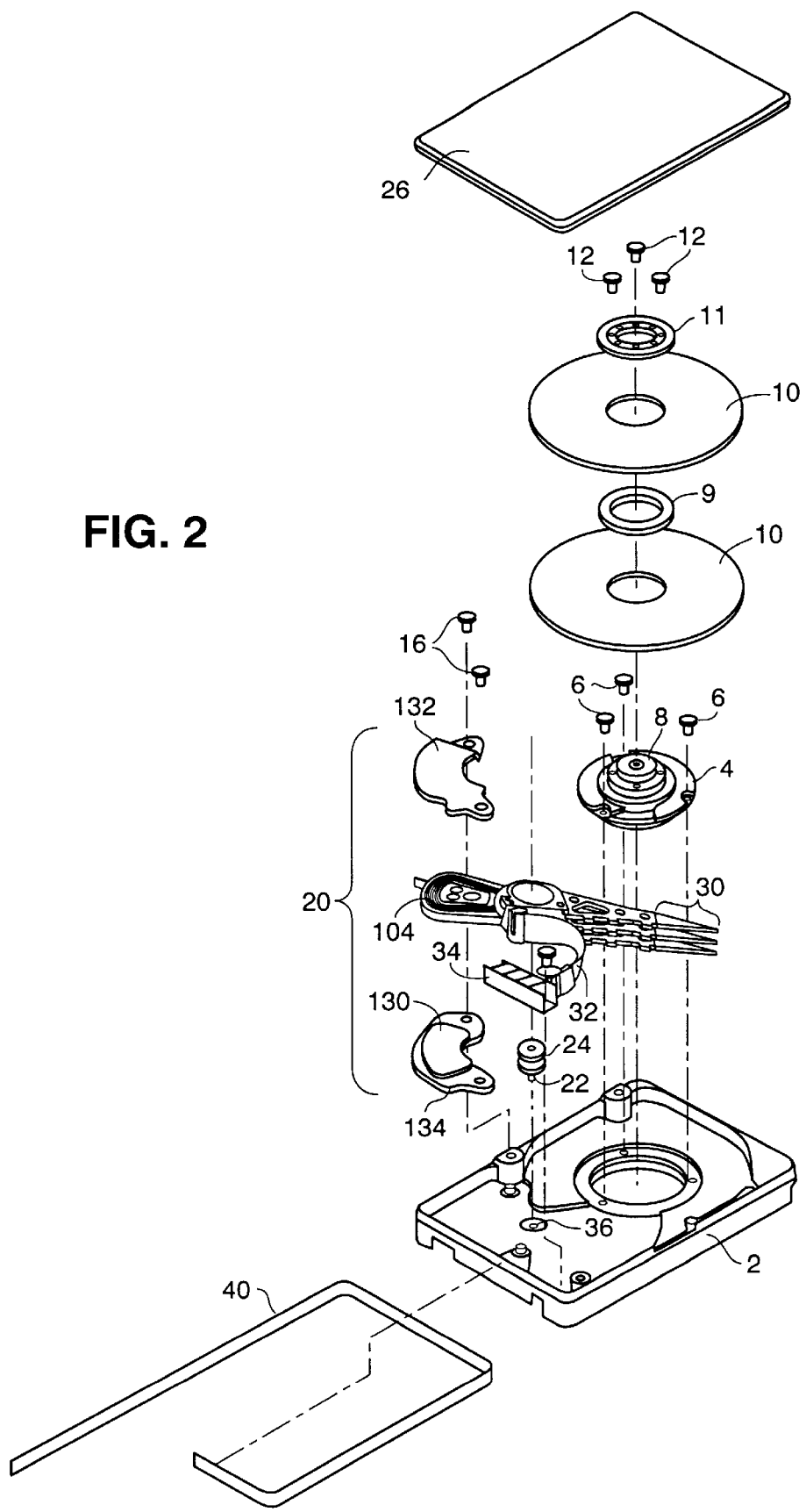
FIG. 2 is an exploded, perspective view of the present invention in relation to the fundamental components of a disk drive.

The basic construction of a disk drive—also known in the art as a head disk assembly, or simply an HDA—is shown in FIG. 2. A base 2 (such as a metal plate construction), when combined with a cover 26, forms a housing for holding the disk drive's operational components therein. When assembled, the cover 26 is secured to the base 2 and sealed by using a sealing tape 40 around the periphery of each where they are conjoined. A tape seal is disclosed in U.S. Pat. No. 5,270,887, assigned to the common assignee of the present invention and incorporated herein by reference in its entirety.

A spindle motor 4 is mounted to the base 2 by appropriate fasteners 6. For simplicity, electrical connection to the spindle motor 4 is not shown, but would be well-known to persons skilled in the art. The spindle motor 4 has an extended, spindle motor hub 8. At least one data storage disk 10 (two shown with a spacer 9 intermediate) is fastened to the hub 8 by a disk clamp 11 using appropriate fasteners 12. Such disks 10 have recording areas on one or both surfaces.

An actuator assembly 20 includes a coil 104 (FIG. 3) that interacts in a magnetically-coupled circuit comprising a permanent magnet 130, an upper flux return plate 132, and a lower flux return plate 134. This mechanism is commonly referred to in the art as a "rotary voice coil motor." The plates 132, 134 are mounted to the base 2 with fasteners 16.

A bearing cartridge 24 using a pivot post 22 attaches to and supports the actuator assembly 20 while permitting rotary actuator motion with respect to the base 2, for example, by inserting and fastening a lower end of the post 22 into a complementary receptacle 36 in the base 2. The pivot post 22 thus defines a pivotal axis of rotation for the moving parts of the actuator head stack assembly.

Figure 3:
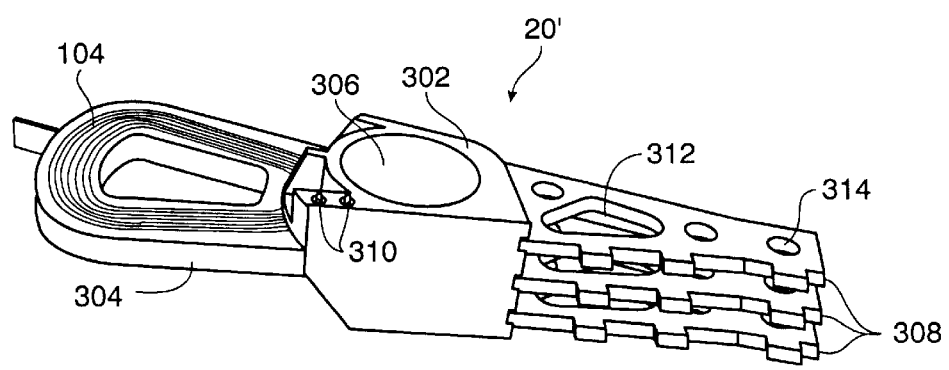
FIG. 3 is a detail drawing in perspective view of a part of a head stack assembly of an actuator assembly without the flex circuit attachment and routing features the present invention.

Turning now to FIG. 3, an exemplary embodiment of a portion of an actuator assembly 20' is depicted. A pivot body 302 is preferably molded from a plastic resin into a unitary piece. This unitary construction includes overmolding a loop-shaped coil support 304 on one side of the pivot body 302 onto which an electrical coil 104 is affixed. Coil electrical interconnect pins, or terminals, 310 are similarly overmolded and can extend slightly from the pivot body 302 for appropriate electrical connections, such as to a flex circuit (not shown in FIG. 3, but see FIGS. 5 and 7).

A pivot body bore 306, extending all the way through the pivot body 302, is provided for receiving the bearing cartridge 24 therein (see FIG. 2).

Figure 1:
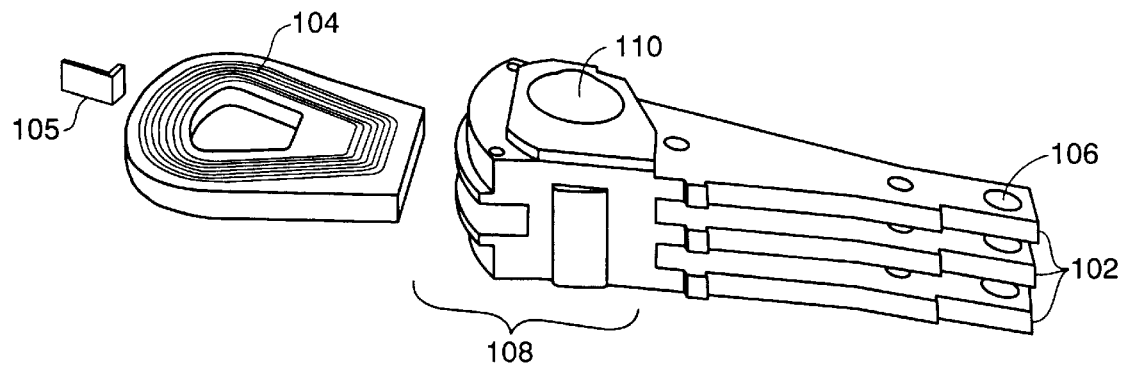
FIG. 1 (Prior Art) is an exploded, perspective view of piece parts of a disk drive actuator head stack assembly.
Figure 4:
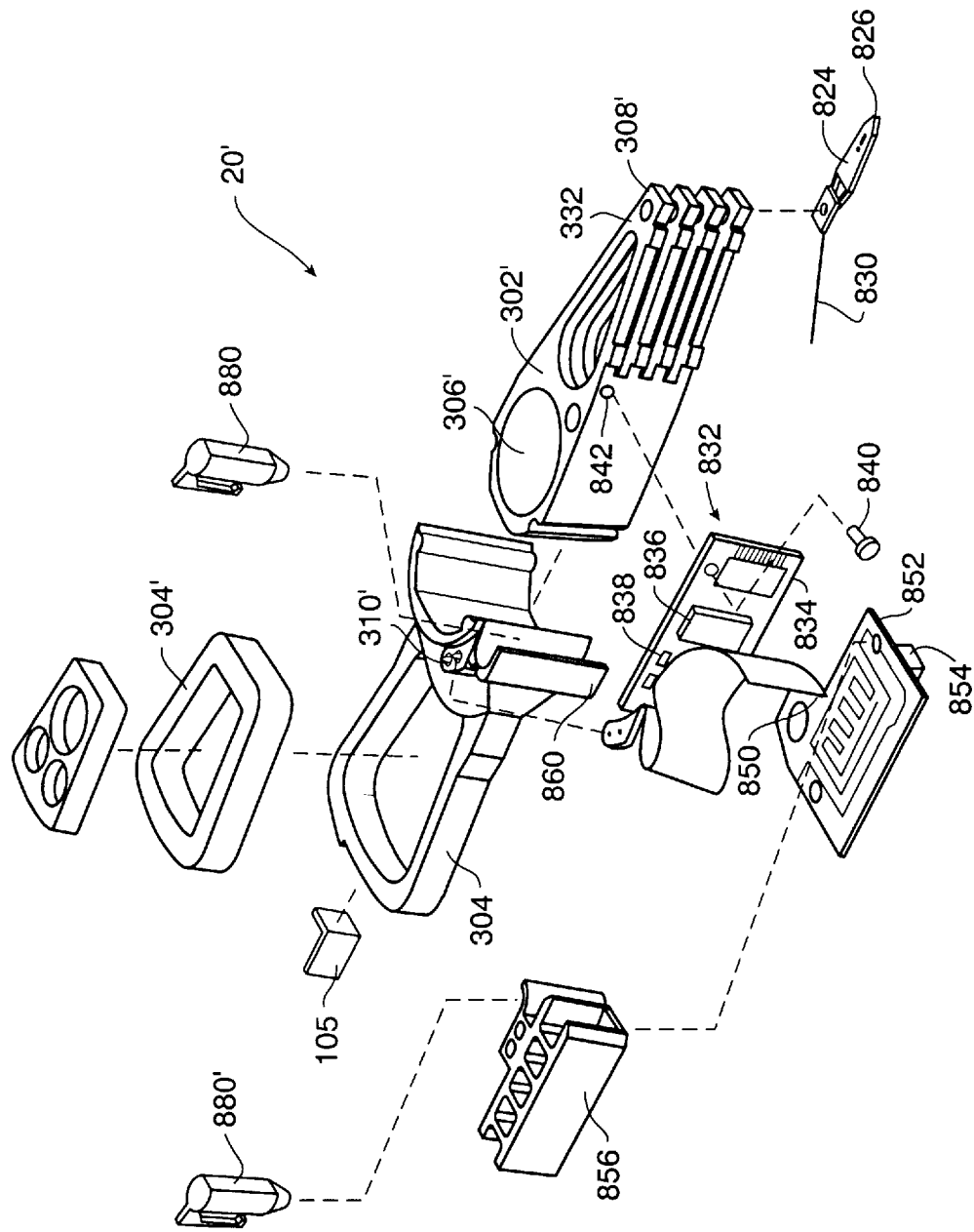
FIG. 4 is a exploded, perspective view of an actuator assembly (without a voice coil magnet, plate, and return) of the present invention.

In a molded plastic embodiment, head suspension support arms 308, rather than comprising a part of a full metal E-block construction as shown in FIG. 1 (Prior Art), comprise individual stamped sheet metal components as shown in FIG. 4. Where the inner ends of the individual support arms 308 contact the pivot body 302, they can also be overmolded in the process of molding the pivot body 302 as shown in FIG. 3. One or more support arms 308 are provided in conformance to the particular head disk assembly design as needed.

Referring again to FIG. 3, the support arms 308 are mounted to be diametrically opposing the coil support 304 in the preferred embodiment. Obviously, other configurations can be designed depending upon how the operative components of the drive are to be mounted relative to each other within the drive housing; that is, the layout use in a large desktop or tower computer may be different from that in a notebook computer where space is at a premium. While three support arms 308 are shown, it will be apparent to a person skilled in the art that any number appropriate to the number of disks 10 (FIG. 2) and recording surfaces on each (i.e., single-sided or double-sided) can be provided (see e.g., FIG. 4 showing a four arm/six head structure embodiment which would be useful for a three, double-sided disk, HDA).

The weight of the support arms 308 is further reduced by cut-out sections 312. The cut-outs are designed to appropriately reduce mass without critically affecting rigidity. Swage holes 314 are provided in the extreme tips of the support arms 308 for mounting a head suspension with read-write head elements thereon. With the addition of a head gimbal assembly, or HGA, 30 (having load beams and slider mounted heads with appropriate leads (not shown)—also referred to hereinafter as the "head suspension"), a flex circuit assembly 32, and an electrical connector and mounting bracket 34 as shown in FIG. 2, this actuator device is commonly referred in the art as the head stack assembly.

A high modulus of elasticity is needed for rigidity and resonance performance. Since the total mass of the rotating portion of an actuator assembly has been substantially reduced by the provision of the plastic pivot body 302 and coil support 304 (see FIG. 3), aluminum, with its relatively high modulus of elasticity, can still be used for the overmolded support arms 308. In other words, the heavy metallic body portion 108 of the prior art E-block 102 as shown in FIG. 1 is not needed and has been eliminated. This lowers the overall actuator inertia which facilitates faster actuator operation, but also makes the actuator assembly 20 moving parts more susceptible to motion including that from undesirable forces.

Turning now to FIG. 4, a preferred embodiment of a head stack assembly 20' in accordance with the present invention is depicted. (Note that while shown as separate parts the coil support 304 for coupling to the coil 304' and plastic body 302' containing the pivot bearing hole 306' may be a unitary, molded plastic part.) Head suspension members 824 are swaged to the tips 308' of support arm members 332. Read-write head elements (not shown) are fixed to the outer tips 826 of the suspension members 824. Each head element at said outer tips 826 has a set of electric leads 830 (generally micro-thin wires in twisted pairs) as would be known in the art. The leads 830 run from the head elements along the suspension members 824 and the support arm members 332 and are connected to signal amplification circuitry 832.

The signal amplification circuitry 832 can include a thin film circuit board 834. The circuit board 834 is affixed to the actuator pivot body 302' by a suitable fastener 840 received through the circuit board and into a compatible retaining aperture 842 of the pivot body 302'. In the preferred embodiment, a region of a flex circuit 850 is affixed to an actuator pivot body member 302' and that "passive" region itself used as the circuit board on which an integrated circuit, such as a pre-amplifier integrated circuit, or like input-output circuit, 836 and any microcomponents 838 associated therewith, are then mounted.

Figure 5:
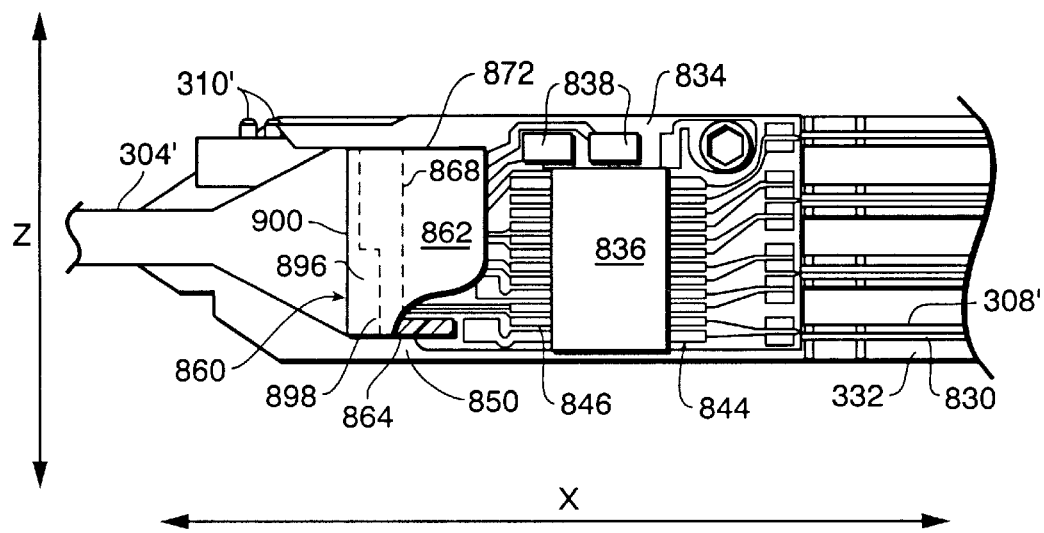
FIG. 5 is a plan view (side) of a portion of the actuator assembly in accordance with the present invention as shown in FIG. 4 without the tape retention device in position.

As shown in more detail in FIG. 5, the leads 830 are bonded to connector pads on the thin film circuit board 834 which are connected to pins 844 on the pre-amplifier 836 by use of printed circuit traces. A second set of pre-amplifier pins 846 is electrically connected to the flex circuit 850. The flex circuit 850 is also used to connect to the coil electrical interconnect pins 310'. Again, the flex circuit 850 is also used to connect and an actuator assembly to housing ground.

Returning to FIG. 4, the flex circuit 850 is connected at its opposite end to other circuitry, such as another integrated circuit device, or an electrical connector circuit, 852 having a pin connector 854 for connecting the coil 104 (FIGS. 2 and 3) and the circuitry on the actuator to read-write channel electronics and a drive controller (not shown) as would be known in the art. A mounting bracket 856 is provided to affix the connector circuit 852 and the pin connector 854 to the base 2 (FIG. 2).

Once the drive is assembled, the bending of the flex circuit 850 (also shown in FIG. 2, designation numeral 32) would cause the flex circuit to act as a spring, exerting a torque on the head stack assembly. If not otherwise controlled, this torque will be applied to the actuator assembly and then must then be compensated for by the voice coil motor.

In accordance with the present invention, this flex circuit spring force created torque is minimized by retention and guiding of the flex circuit 850 at each end thereof in a predetermined manner.

A tape guide 860 is provided at the head stack assembly 20' in a predetermined position and with a predetermined specific shape to direct the spring force vector created by the flex circuit 850 through the actuator axis of rotation. A similar tape guide 860' with the same functionality is provided at the mounting bracket 856.

Figure 6:
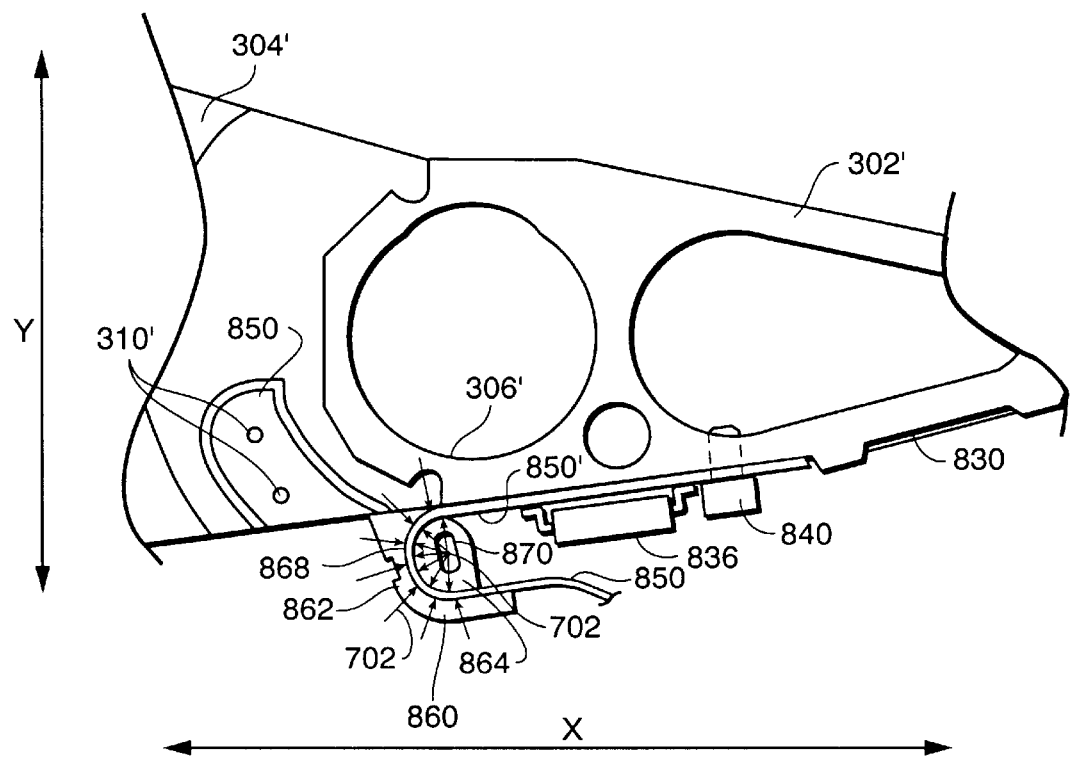
FIG. 6 is a plan view (top) of the present invention as shown in FIG. 5.

As shown FIGS. 4, 5 and 6, in the preferred embodiment, the tape guide 860 is integrally molded in the formation of the coil support portion of the head stack assembly 20' (see e.g. FIG. 4 where it is a unitary construction with the coil support piece parts). The tape guide 860 has a curved body 862 (partially cut away in FIG. 5); an arcuate shape makes a predetermined loop of the flex circuit 850 (shown in this exemplary embodiment as an approximate one hundred and eighty degrees (180°)) in the "X" axis when traversing an inner wall 868 of the tape guide 860 in the "Y" axis. The looping of the flex circuit 850 within the tape guide 860 is a noteworthy feature of the present invention in that the exit angle of the flex circuit 850 from the tape guide 860 is specifically designed such that a force vector from the spring effect of the bent flex circuit 850 points at the axis of rotation of the head stack assembly. In other words, as shown in FIG. 2, when assembled, the rotary actuator will pivot via the bearing cartridge 24 about post 22. The bearing cartridge 24 and post 22 thus define the axis of rotation of the actuator. The directing of the force vector at this axis of rotation is intended to eliminate, or at the least minimize, any application of torque to the actuator assembly 20' when the flex circuit 850 is bent.

As best seen in FIG. 5 (at the cut-away portion of the curved body 862), at one end of the tape guide body 862 is a shelf 864 which closes the loop and forms a stop against which one edge of the flex circuit tape 850 is constrained in the "Z" axis within the tape guide 860. The shelf 864 has a central aperture 870 therethrough. The other end 872 of the tape guide 860 body (in the "Z" axis as shown in FIG. 5) is open ended.

Note that if the body member 302' (FIG. 4) or the coil support is molded of plastic, the tape guide 860 can be a unitary, molded plastic, projection extending from one or the other as the actuator design requires. The projection can form a cavity having an arcuate shape for receiving a portion of said flex circuit 850 therein.

Figure 8:
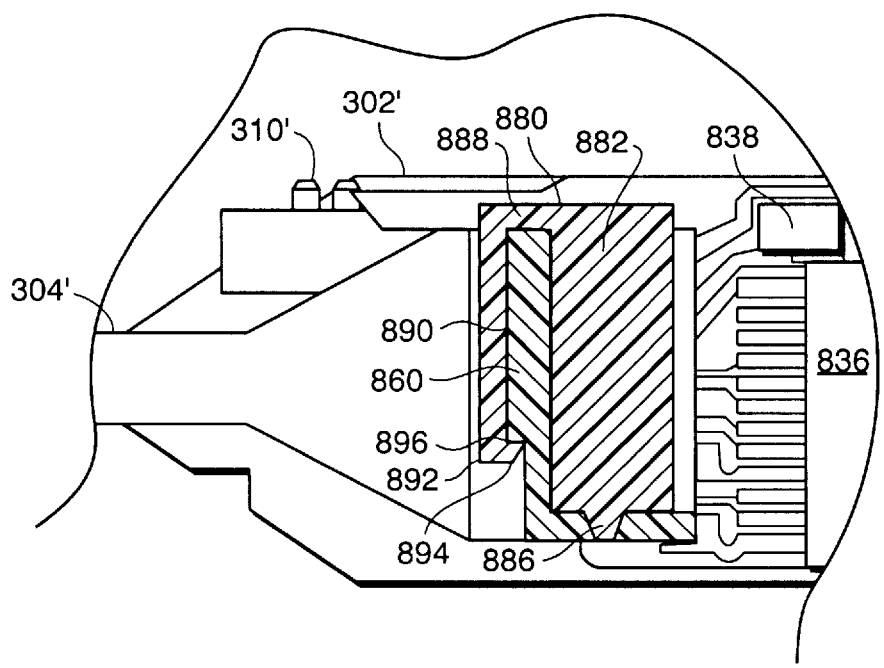
FIG. 8 is partial cross-section plan view (side) of the retention device for the present invention as shown in FIG. 7.
Figure 9:
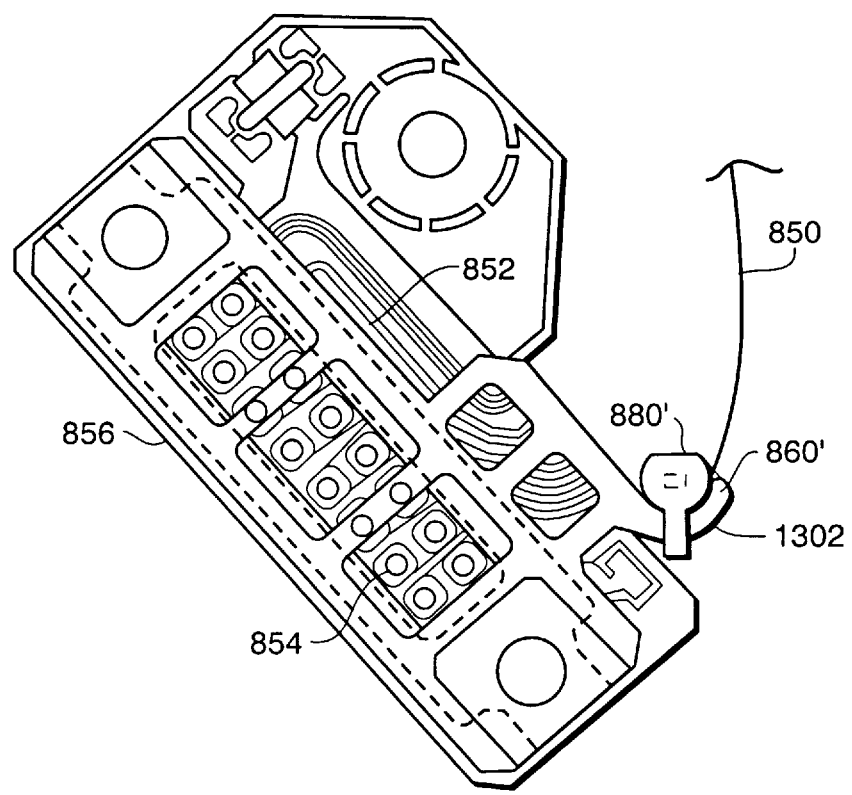
FIG. 9 is a plan view (top) of an electrical connector having a a mounting bracket with a tape guiding device and attached retaining device of the present invention.

As shown in FIGS. 8 and 9, a snap-fit, flex circuit tape retention device 880 is used to constrain the flex circuit 850 up against the inner wall 868 of the tape guide 860. It is designed to minimize the potential for misalignment resulting from material handling during assembly operations, shipping, and consumer handling. It further prevents any cupping of the flex circuit 850. Moreover, by so interacting with the retention device 880, it ensures that the proper exit angle of the flex circuit 850 is maintained throughout the rotary motion of the actuator about the pivot axis; namely, that the force vector is directed toward that pivot axis.

Figure 7:
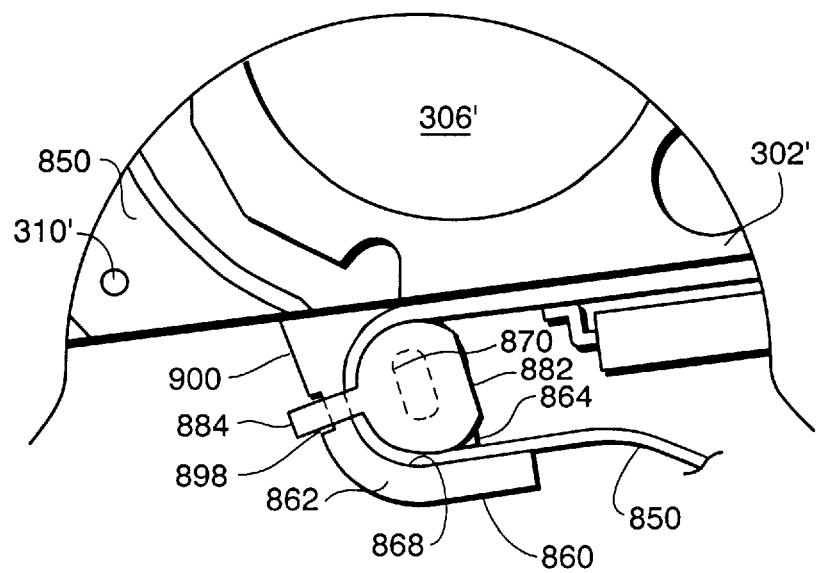
FIG. 7 is a plan view (top) of a portion of the present invention as shown in FIGS. 5 and 6, illustrating a tape guiding device and attached tape retention device of the present invention.

The retention device 880 has a body portion 882 and a clip arm portion 884. In essence, the body portion 882 is a complementary guide post adapted to slip fit within the arcuate tape guide 860. The body portion 882 has an extension pin ("Protrusion") 886 at one end thereof that is adapted to seat within the aperture 870 of the shelf 864 of the tape guide 860. At the other end of the retention device 880, the clip arm portion 884 protrudes in a first section 888 perpendicularly from the body portion 882 and then descends in a second section 890 parallel thereto. At the termination end 892 of the second section 890, a perpendicular tongue 894 extends back toward the body portion 882 of the retention device 880. Thus, as best seen in FIGS. 7 and 8, the retention clip arm portion 884 forms a hook adapted to catch on a detente feature ("recess") 896 in a cut-out channel 898 molded into the outer side wall 900 of the tape guide 860. That is, the body portion 882 slides into the loop of the tape guide body 862 with the flex circuit 850 between the inner wall 868 of the tape guide 860 and the body portion 882 of the retention device 880. At the same time, the clip arm portion 884 slides into the channel 898 until reaching the end 872 of the tape guide body 860 and a tongue 894 catches on the detente feature 896. Note also that the detente feature 896 also allows for easy removal as the clip arm portion 884 is resilient enough, whether formed of plastic, metal or another material, to flex when retention device 880 is pulled upon in the opposite direction of installation.

Returning to FIG. 6, the flex circuit 850 has a "passive" portion, namely that region 850' affixed to the actuator body 302', and an "active" portion, namely the portion of the tape which extends from the passive portion 850' to the connector circuit 852. The tape guide 860, including the shelf 864, captures the portion of the tape between the passive and active portions.

The body portion 882 of the retention device 880 geometrically matches the shape of the inner wall 868 and the tape 850 as it loops along the inner wall 868 and thus exits the actuator assembly 20' (FIG. 4). It should be noted that the geometry of the tape guide 860 molded loop is designed for each specific implementation of a head stack assembly (as is also capable of being used in a linear motion actuator). In the shown embodiment, this feature is substantially cylindrical, allowing for a complimentary cylindrical-shaped retention device 880; other geometries may be designed for specific applications. Moreover, the projecting tape guide 860 is located such that the loop developed in the flex circuit is parallel and proximate the pivot axis of rotation of the actuator assembly 20 in order to minimize the torque forces developed when a flex circuit is bent (see arrows 702, FIG. 6).

A proper exit angle for the flex circuit 850 is thus, provided. That is, the location of the exiting portion of the looped surface of the tape on the actuator is matched to the required position and exit angle for optimized actuator assembly 20' (FIG. 4) rotary motion about pivot post 22 (FIG. 2). The exit angle serves to minimize the effect of the bias spring torque force of the flex circuit 850 on the actuator driving system. As disclosed above, the retention device 880 is held in place through mating features in the clip arm portion 884 and tape guide 860 that constrain its motion in all directions when the cylindrical pin 886 mates in the aperture 870 of the shelf 864 while the clip arm tongue 894 is hooked over the detente surface 896, the descending second section 890 also being captured by the channel 898, preventing any rotation of the retention device 880. Note that so loaded, the detente surface 896 constrains the pin 886 from motion opposite that of its installation direction and provides spring loading to assist in holding the flex circuit 850 in its desired position (see FIG. 6, arrows 702).

As shown in FIG. 9, the same type combination tape guide 860' and retention device 880' is used as a flex circuit routing device 1302 for the end of the flex circuit 850 that mates with the connector 852 (mounted on the base 2 as shown in FIG. 2). Note the adaptation of the tape guide 860' retention device 880' to a different exit angle configuration than at the flex circuit end proximate the actuator body 302'. This angle is also selected such that the force vector at this connector end of the flex circuit 850 is pointed at the pivot axis of rotation.

Figure 10:
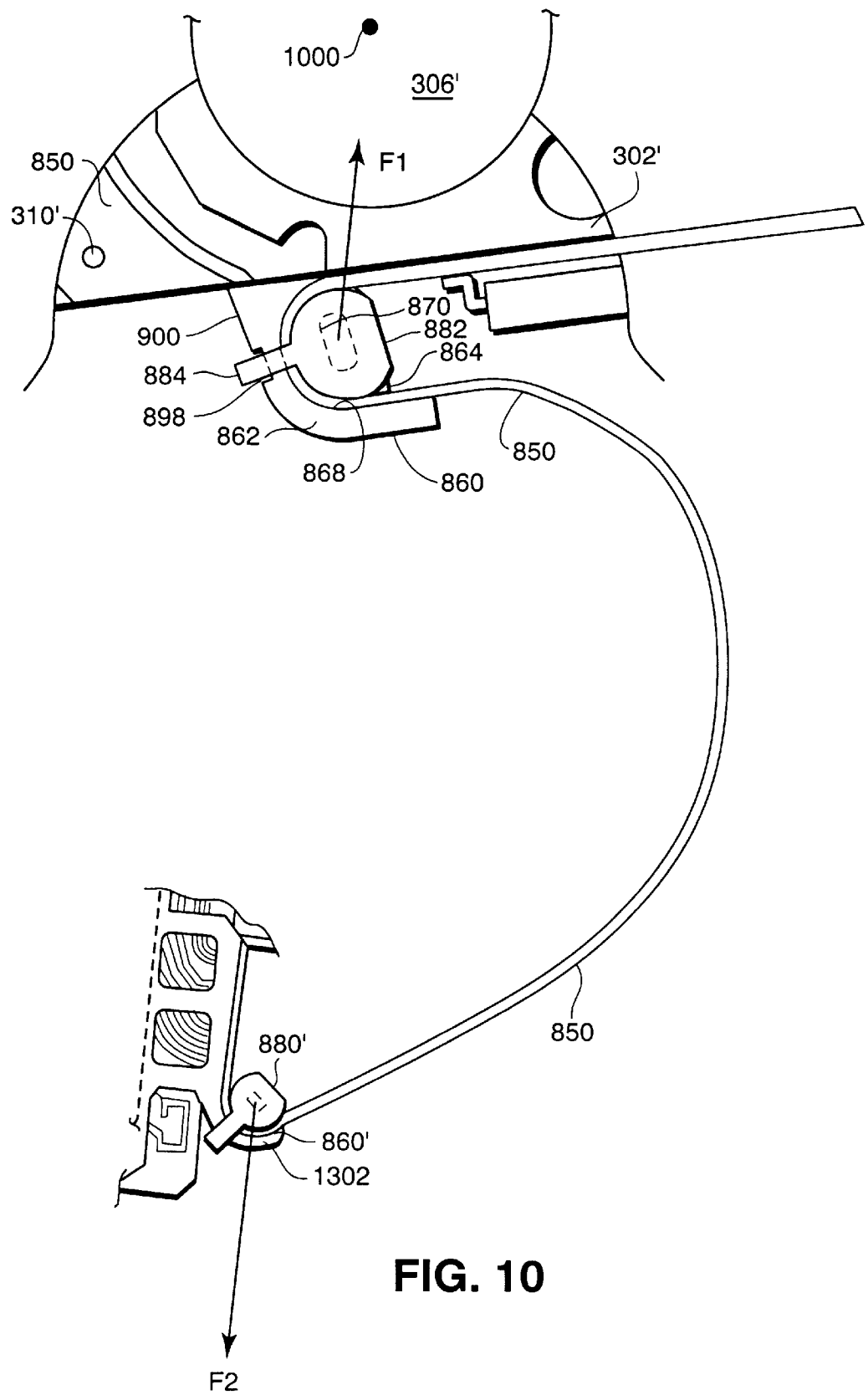
FIG. 10 is a plan view (top) of the present invention combining portions of FIGS. 8 and 9 to depict flex circuit spring force vector orientation in accordance with the present invention.

Thus, the combination of geometries at the flex circuit connections is selected to minimize or eliminate any torque on the actuator assembly from spring forces developed in the flex circuit 850 due to its bending throughout the stroke range of motion of the heads across the disk recording surface. This is depicted in FIG. 10 where point 1000 represents the pivot axis of rotation and arrows F1 and F2 represent the force vectors of the flex circuit trying to uncurl to its natural (manufactured) flat state. Naturally, the force vectors may rotate to a slight degree during rotation of the actuator.

Figure 11:
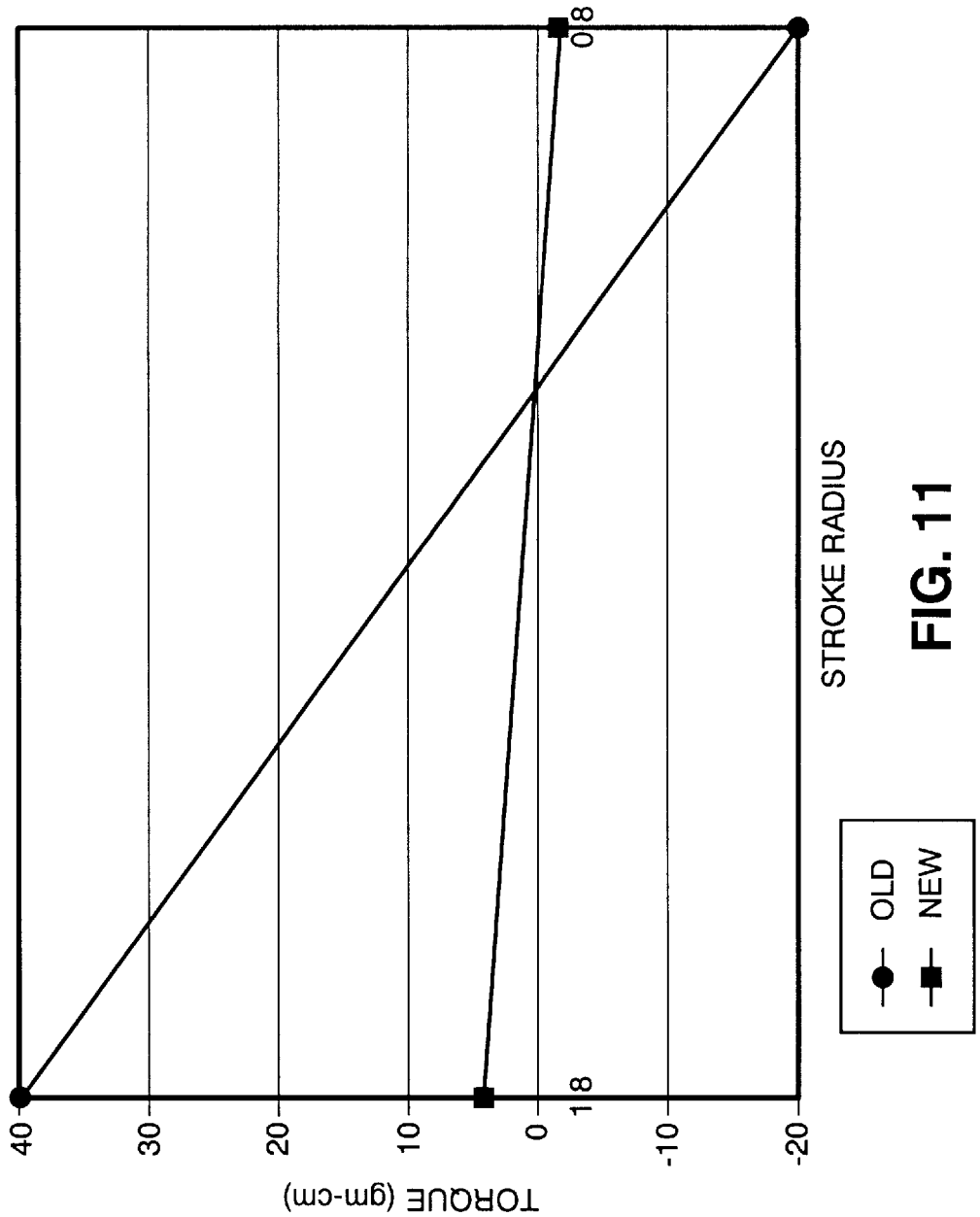
FIG. 11 is a graph (idealized data) showing a comparison of flex bias on an actuator with and without employment of the present invention.

FIG. 11 is a comparison of torque exerted on an actuator during its stroke from an outer radius position of 1.8 inches to an inner radius position of 0.8 inch, where the "OLD" data line (-x-) represents a torque curve when the force vectors are uncontrolled and the "NEW" data line (-.-) represents a torque curve when, throughout the stroke of the actuator across the disk, the force vectors are directed in accordance with the present invention toward the actuator pivot axis.

While the flex circuit routing device of the present invention has been shown in a disk drive having one actuator assembly, modifications can be made to adapt the device to multiple actuator drives. Moreover, while the flex circuit routing device of the present invention has been shown in a disk drive having a rotary actuator assembly, modifications can be made to adapt the device to a linear motion actuator drive.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A head-stack assembly (HSA) for a disk drive, the disk drive having a housing and a disk in the housing, the disk having a recording surface, the head-stack assembly comprising:

a head for reading from and writing to the recording surface;

support means for supporting the head adjacent the recording surface, the support means including a molded actuator body with a bore through it;

the molded actuator body having a first molded tape guide portion with a first shelf and outer and inner walls, the first shelf having a hole, the outer wall having a recess and the inner wall defining a first curved surface having a first axis disposed orthogonally to the first shelf;

an electrical connector including means for coupling to the housing;

a flex circuit having two edges defining a width and means for providing an interconnecting path between the read/write head and the electrical connector, the flex circuit including a first portion disposed with an exit angle at the molded actuator body with one of the two edges adjacent the first shelf and a second portion disposed at the electrical connector; and a first retention device having a clip arm portion and a body portion, the body portion having an outer wall defining a second curved surface with a second axis, wherein the body portion includes a protrusion for engaging the hole in the first shelf and the clip arm portion includes a tongue for engaging the recess in the outer wall of the first molded tape guide portion, the first retention device disposed in fixed engagement with the first molded tape guide, with the first and second axes disposed parallel to the pivot axis, to capture all of the width of the first portion of the flex circuit between the first and second curved surfaces, thereby defining the exit angle of the flex circuit at the molded actuator body.

2. The head-stack assembly of claim 1 further comprising:

a molded mounting bracket fixed to the electrical connector and having a second molded tape guide portion with a second shelf and outer and inner walls, the second shelf having a hole, the outer wall having a recess and the inner wall defining a third curved surface having a third axis disposed orthogonally to the second shelf;

the second flex circuit portion disposed with an exit angle at the molded mounting bracket with one of the two edges adjacent the second shelf; and a second retention device having a clip arm portion and a body portion, the body portion with an outer wall defining a fourth curved surface with a fourth axis, wherein the body portion includes a protrusion for engaging the hole in the second shelf and the clip arm portion includes a tongue for engaging the recess in the outer wall of the second molded tape guide portion, the second retention device disposed in fixed engagement with the second molded tape guide portion, with the third and fourth axes disposed parallel to the pivot axis, to capture all of the width of the second portion of the flex circuit between the third and fourth curved surfaces, thereby defining the exit angle of the flex circuit at the molded mounting bracket.

3. The head-stack assembly of claim 1 wherein the first curved surface has essentially the same geometry as the third curved surface and the first retention device has essentially the same geometry as the second retention device.

4. The head-stack assembly of claim 1 wherein the first, second, third and fourth curved surfaces are essentially cylindrical.

5. A disk drive comprising:

a housing;

a disk in the housing, the disk having a recording surface;

a head for reading from and writing to the recording surface;

support means for supporting the head adjacent the recording surface, the support means including a molded actuator body with a bore through it;

a pivot bearing cartridge in the bore, the pivot bearing cartridge being fixed to the housing to define a pivot axis;

the molded actuator body having a first molded tape guide portion with a first shelf and outer and inner walls, the first shelf having a hole, the outer wall having a recess and the inner wall defining a first curved surface having a first axis disposed orthogonally to the first shelf;

an electrical connector fixed to the housing;

a flex circuit having two edges defining a width and means for providing an interconnecting path between the read/write head and the electrical connector, the flex circuit including a first portion disposed with an exit angle at the molded actuator body with one of the two edges adjacent the first shelf and a second portion disposed at the electrical connector, the flex circuit producing a force on the molded actuator body, wherein the exit angle of the flex circuit at the molded actuator body is such that the force on the molded actuator body produced by the flex circuit is directed toward the pivot axis; and a first retention device having a clip arm portion and a body portion, the body portion having an outer wall defining a second curved surface with a second axis, wherein the body portion includes a protrusion for engaging the hole in the first shelf and the clip arm portion includes a tongue for engaging the recess in the outer wall of the first molded tape guide portion, the first retention device disposed in fixed engagement with the first molded tape guide portion, with the first and second axes disposed parallel to the pivot axis, to capture all of the width of the first portion of the flex circuit between the first and second curved surfaces, thereby defining the exit angle of the flex circuit at the molded actuator body.

6. The disk drive of claim 5 further comprising:

a molded mounting bracket fixed to the electrical connector and having a second molded tape guide portion with a second shelf and outer and inner walls, the second shelf having a hole, the outer wall having a recess and the inner wall defining a third curved surface having a third axis disposed orthogonally to the second shelf;

the second flex circuit portion disposed with an exit angle at the molded mounting bracket with one of the two edges adjacent the second shelf, wherein the exit angle of the flex circuit at the molded mounting bracket is such that the force on the molded actuator body produced by the flex circuit is directed toward the pivot axis; and a second retention device having a clip arm portion and a body portion, the body portion with an outer wall defining a fourth curved surface with a fourth axis, wherein the body portion includes a protrusion for engaging the hole in the second shelf and the clip arm portion includes a tongue for engaging the recess in the outer wall of the second molded tape guide portion, the second retention device disposed in fixed engagement with the second molded tape guide portion, with the third and fourth axes disposed parallel to the pivot axis, to capture all of the width of the second portion of the flex circuit between the third and fourth curved surfaces, thereby defining the exit angle of the flex circuit at the molded mounting bracket.

7. The disk drive of claim 6 wherein the first curved surface has essentially the same geometry as the third curved surface and the first retention device has essentially the same geometry as the second retention device.

8. The disk drive of claim 6 wherein the first, second, third and fourth curved surfaces are essentially cylindrical.

* * * * *